United States Patent [19]

Kalberer et al.

[11] Patent Number: 5,110,040
[45] Date of Patent: May 5, 1992

[54] POUR SPOUT CONSTRUCTION AND METHOD

[76] Inventors: Roderick W. Kalberer, 168 Lake Rd., Salisbury Mills, N.Y. 12577; Frederick J. Henkel, 1291 Barsanlaw Dr., Raleigh, N.C. 27613; Arnold L. Berzins, 415 Fern St., P.O. Westwood, N.J. 07675

[21] Appl. No.: 693,197

[22] Filed: Apr. 30, 1991

[51] Int. Cl.$^5$ ............................................... B65D 5/74
[52] U.S. Cl. ......................... 229/125.14; 53/DIG. 2; 220/288; 222/546; 222/557; 493/87
[58] Field of Search ............ 229/125.09, 125.14, 229/125.15, 125.42; 220/288; 222/545, 546, 556, 557; 53/471, 478, DIG. 2; 493/87, 133, 135

[56] References Cited

U.S. PATENT DOCUMENTS

| | | | |
|---|---|---|---|
| 3,956,046 | 5/1976 | Tsuchiya et al. | 53/DIG. 2 |
| 4,637,199 | 1/1987 | Steck et al. | 53/DIG. 2 |
| 4,813,578 | 3/1989 | Gordon et al. | 229/125.14 |
| 4,909,434 | 3/1990 | Jones et al. | 493/87 |
| 4,964,562 | 10/1990 | Gordon | 493/87 |
| 5,058,360 | 10/1991 | Yamazaki et al. | 53/DIG. 2 |

FOREIGN PATENT DOCUMENTS

| | | | |
|---|---|---|---|
| 2917457 | 11/1979 | Fed. Rep. of Germany | 53/DIG. 2 |
| 2645502 | 10/1990 | France | 493/87 |
| 2645503 | 10/1990 | France | 493/87 |
| 8202852 | 9/1982 | PCT Int'l Appl. | 493/87 |

Primary Examiner—Gary E. Elkins

[57] ABSTRACT

A pour spout carton for extended shelf life paperboard containers, such as those of the gable top type. A dispensing opening is formed, as by die cutting, in a panel of the carton. A pour spout carries a flange extending from the edge of the dispensing hole to a location radically beyond the dispensing opening, the flange sonically bonded to the outer barrier layer along an annular outermost knurled zone. The knurled zone sonic horn configuration yields pour spout attachment times and spout attachment integrity superior to known prior spout attachment methods and spout constructions.

9 Claims, 3 Drawing Sheets

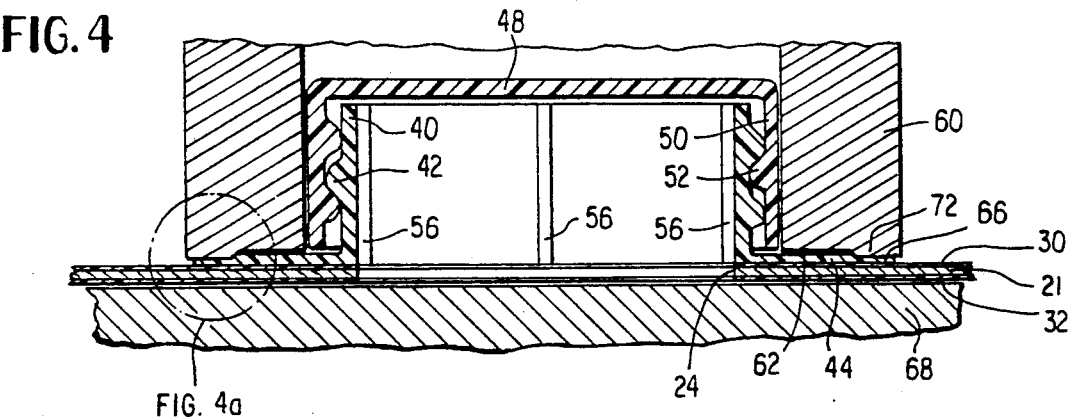
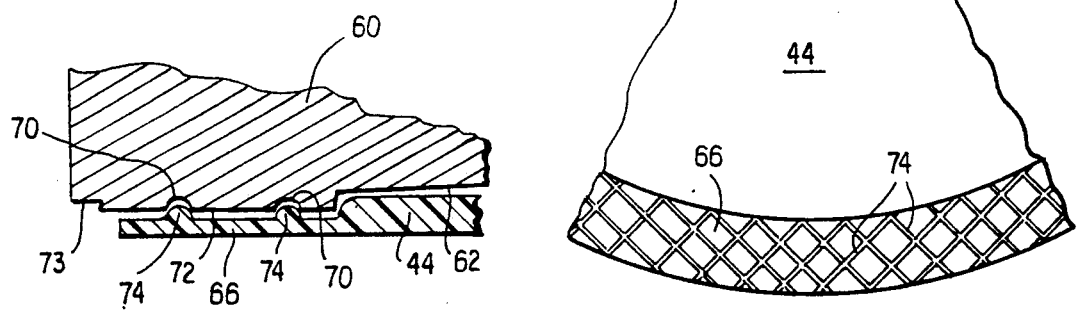
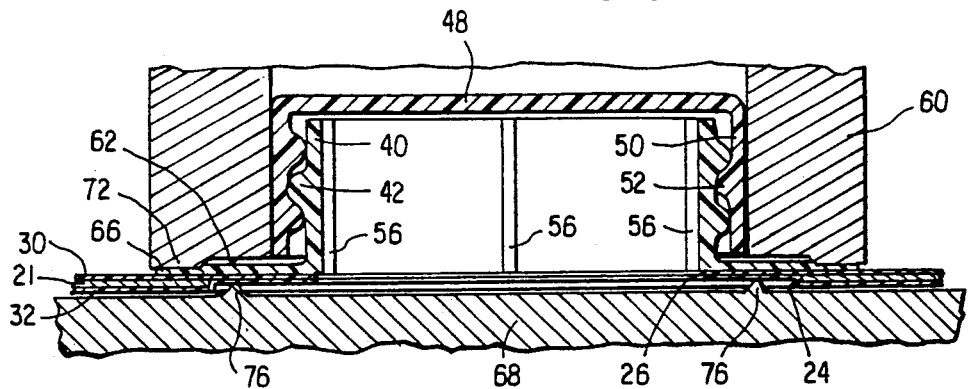

POUR SPOUT CONSTRUCTION AND METHOD

BACKGROUND OF THE INVENTION

This invention relates to the packaging of liquid or powder products, such as fruit juices, milk, sugar, salt, soap powders and the like and more particularly to a carton construction having a flanged pour spout.

Aside from a required barrier layer on the carton interior surfaces for packaging certain product types, such as potables, known methods and apparatus for bonding a pour spout to a paperboard container or blank, such as a gable top container or blank therefor, yield only relatively modest bonding or welding rates.

In copending patent application Ser. No. 07/551,818 filed July 12, 1990 (commonly assigned and incorporated by reference) a similar pour spout/carton construction and method is disclosed. There, an annular ultrasonic sealing horn is provided with radially spaced, concentric ridges. The ridges engage the flange of a flanged plastic pour spout and bond the flange to a plastic coated carton upon actuation of the horn.

SUMMARY OF THE INVENTION

This invention permits relatively high rates of sealing speeds to bond pour spouts to gable top type paperboard containers. A specific knurled ring sonic horn surface configuration yields superior pour spout bonding to the carton. The sonic head is provided with a zone or annulus of knurls on its working surface to rapidly and efficiently heat bond the spout flange to the usual polyethylene coating or to a specific barrier layer on the carton exterior.

BRIEF DESCRIPTION OF THE DRAWINGS

FIG. 4 is a view similar to FIG. 3 and illustrates the method of assembly of the pour spout in conjunction with the knurled ultrasonic horn of this invention.

FIG. 4a is an enlarged view of that portion within the dashed circle of FIG. 4.

FIG. 5 is a plan view of the spout flange after its attachment to the paperboard blank of FIG. 2.

FIG. 6 is a view similar to FIG. 4 and illustrates another embodiment.

DETAILED DESCRIPTION OF THE INVENTION

Figure 1:
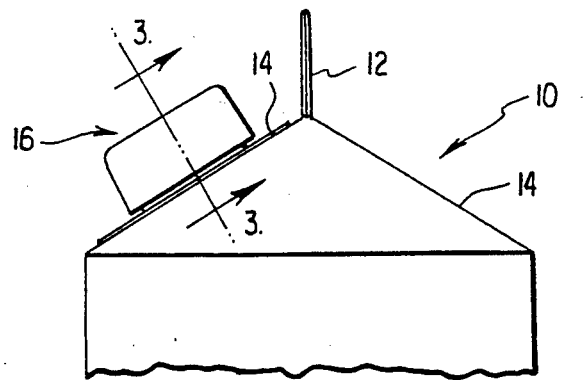
FIG. 1 is a partial end elevational view of a typical gable top container provided with the pour spout construction of this invention.

Referring now to FIG. 1, the upper portion of an otherwise conventional gable top container 10 having the usual upper fin 12 and slanting gable walls 14 is illustrated. A plastic pour spout fitment and cap assembly is denoted generally as 16. The container partially illustrated at FIG. 1 is similar to that shown at FIG. 1 of U.S. Pat. No. 4,813,578 issued to Robert L. Gordon et al.

Figure 2:
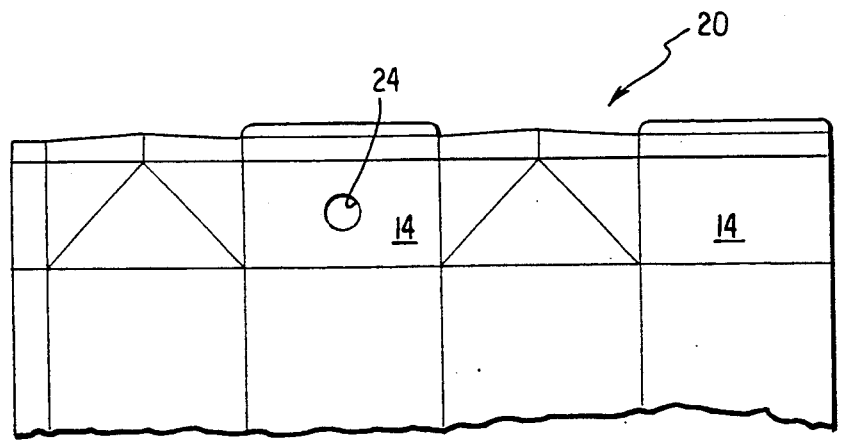
FIG. 2 is a plan view of the upper portion of a typical paperboard blank from which the gable top container of FIG. 1 is fashioned.

FIG. 2 illustrates the upper portion 20 of a conventional paperboard blank for forming a gable top carton. One of the gable forming panels 14 of the blank is provided with a die cut dispensing opening 24.

Figure 3:
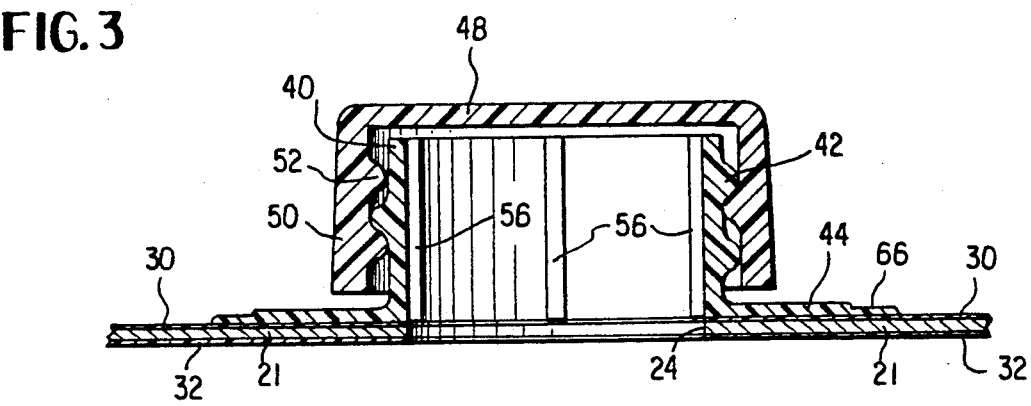
FIG. 3 is a view taken in the direction of 3—3 of FIG. 1 and illustrates the pour spout construction of this invention.

FIG. 3 illustrates the construction of the pour spout attachment of this invention. The paperboard from which blank 20 is fashioned is denoted as 21. The usual polyethylene layer or coating on the exterior of the blank is designated as 30, with an internal barrier layer 32 covering the entire surface of one side of the blank, and hence of the completed carton. External polyethylene layer 30 and carton internal barrier layer 32 extend to the edge of dispensing opening 24. The pour spout is denoted by 40 and includes a short cylindrical spout section provided on its exterior with threads 42. The lower portion of the spout carries a flange 44. The spout is fashioned of a plastic material. The pour spout cap includes an upper disk portion 48 having an annular skirt 50 and internal threads 52 on the skirt. Threads 52 and 42 are adapted to become engaged and effect full closure with only one turn of the closure cap.

The radially outermost portion of flange 44 is denoted as 66 and is see to be of lesser thickness than the remainder of the flange. Its upper surface is knurled by male knurlings denoted as 74 (see FIGS. 4a and 5).

The material of the spout is a critical factor. It has to be of a polymer dissimilar to the spout. Upon sonic sealing of the spout flange to the container blank 20 (to be described) the vibration induced heat generated would fuse the spout and cap together if they were of similar materials. The cap material used is polypropylene while the spout material is low density or linear low density polyethylene.

The spout material, LDPE or LLDPE, serves two important functions. First is the above non-fusing relationship to the cap. Secondly, and most important, is the compatibility of this material to the outer surface of the container which is LDPE. When sonic (vibration creating heat) power is applied to the top surface of the flange, the flange material and polymer coating 30 on the paperboard fuse, creating a permanent bond between the spout and carton surface. The flange sealing area from the view point of bonding/sealing rates is critical. If the flange were thinner, holes or stress points would be created. If it were thicker, or the seal surface area covered the entire flange area, a longer dwell time to seal the flange would be required. The 0.020" flange thickness permits the sealing of the fitment to the container at form fill seal rates of 90/min. The combined cap and spout are circular in shape. Thus, there is no concern about alignment or orientation. The top of the spout has a flat uninterrupted surface that acts as a pour lip and a platform to seal the tamper evident membrane. This surface is 0.035" wide which allows for an adequate sealing. On the interior of the spout wall are four vertical ribs. These ribs are used in the molding process to grasp the spout while unscrewing them from the mold and are conventional.

FIG. 4 illustrates the method of bonding the pour spout to the carton shown at FIG. 3. An annular ultrasonic horn 60, the flange and cap pour fitment assembly, the paperboard blank 20 with both layers 30 and 32 and a backup mandrel 68, are all assembled as indicated. The ultrasonic horn 60 has a flat annular end surface 62, modified by this invention so as to include a female knurled outer, annular zone defined by female knurlings 70 of about 0.002 to 0.003 inches in depth. The knurled zone 72 of the horn rests on a radially outermost zone 66 of flange 44. Backup mandrel 68 has a flat upper surface.

Application of sonic energy is transmitted by horn 60 to flange 44. The female knurlings and the downward force of the horn, together with the horn vibrations, give rise to male knurlings 74 on the radially outermost zone of the plastic flange, and also cause a lessing of flange thickness 66 at the zone of the knurlings. The movement or flow of plastic from the top surface of the flange into the female knurlings 70 helps resist lateral sliding movement of the flange relative to the horn face and the backup mandrel. As shown at FIG. 4a, an annular recess 73 is provided on the outer, lower edge of the horn. This inhibits plastic material from the flange from creeping radially outwardly and up the sides of the horn.

FIG. 5 illustrates the annular, outermost knurled zone of female knurlings 74 on flange 44. A corresponding view of the working face of horn 60 would be similar, but the knurlings would be female as indicated at FIG. 4a.

FIG. 6 illustrates a carton/pour spout construction when raw edge protection is required. The dispensing opening 24 is wider and layers 30 and 32 are sealed together by upstanding rim 76 on backup mandrel 68, rim 76 squeezing layers 30 and 32 together through flange 44 by the flat face portion of horn 60. This produces a continuous annular seal around the raw paperboard edge of opening 24. The layers 30 and 32 extend radially inwardly of opening 24, and define a different dispensing opening 26.

Table I shows the improvement in ultrasonic sealing integrity with carton blanks having less than optimum seal surfaces to accept the flange of the pour spout.

TABLE I

| HORN PATTERN | WELD TIME, MS | % FIBER TEAR ON PRINTED CARTONS | |
|---|---|---|---|
| | | LITHO | ROTO |
| 3-ring | 210 | 75 | 72 |
| | 190 | 58 | 53 |
| Knurled Face | 210 | 94 | 95 |
| | 190 | 88 | — |

Most carton blanks, such as those shown at FIG. 2, are printed prior to spout attachment. Carton blanks manufactured for use with pour spouts have a no print and no varnish area specified in the spout flange sealing area. Due to variability in print process control, contamination of the no print/no varnish area is a critical manufacturing issue. Since the printing press operates at very high speeds, significant quantities of contaminated cartons can be produced before the press operator can take corrective action. The ultrasonic horn referenced in the copending application Ser. No. 07/551,818 is particularly sensitive to carton seal area contamination with ink and/or varnish particles. This sensitivity requires both exceedingly tight process control and strict post-production quality control. The improved sealing embodied here produces excellent spout flange to carton bonds despite the presence of contamination in the seal area. The first line of Table I sets out weld time in milliseconds and the seal integrity for two types of printed carton blanks, for a sonic horn working face configuration having three concentric ridges, as shown in noted copending application Ser. No. 07/551,818. The two types of preprinting were offered lithography (LITHO) and rotogravure (ROTO). A (conventional) 1:2 booster was used in conjunction with the ultrasonic horn. The second row sets out the same ultrasonic weld times and type of preprinting, but with the knurled sonic horn working face of this invention. The higher the percent fiber tear when the spout is forcibly removed, the better the seal. It is seen that the seals produced by the knurlings of this invention are superior to those produced by a three ridge sonic horn configuration.

Figure 7:
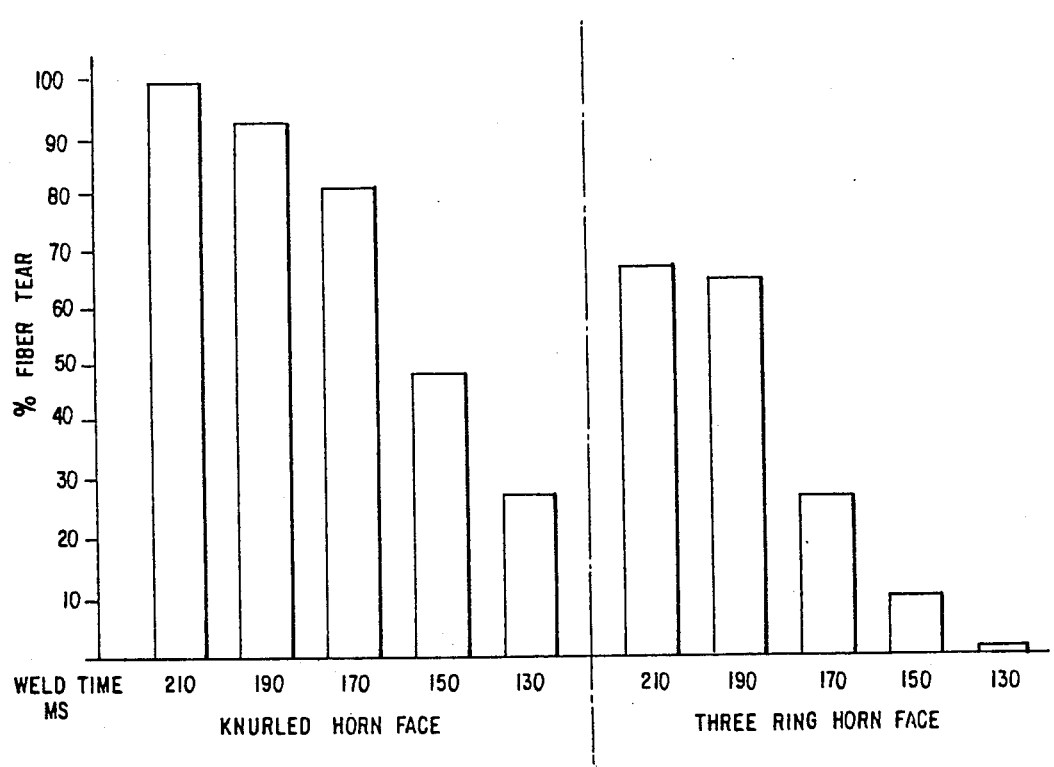
FIG. 7 is a chart illustrating certain differences in flange ultrasonic seals.

FIG. 7 is a bar type graph showing the variation in seal integrity, as measured in percent fiber tear, for several weld times, for both the three ridge horn face described in noted copending application Ser. No. 07/551,818 and the knurled horn face of this invention. In both cases, the horn was provided with a conventional 1:2 booster. For corresponding weld times (measured in milliseconds, MS) it is seen that the knurled horn face produces a better flange to carton weld/seal. The better results are even more pronounced with shorter weld times. For both Table I and FIG. 7, the thickness of flange 44 was 0.020 inches and the parameter "% fiber tear" refers to the percentage of paperboard torn when the flange is forcibly removed from the paperboard. When this parameter is 100% for paperboard 21, no plastic 30 remains on the torn area of the paperboard upon the forced removal of the pour spout.

As may be seen at FIG. 4a, radially inner zone 62 of the horn working face is preferably tapered upwardly about 2 to 3 degrees, the taper running upwardly from left to right.

We claim:

1. A pour spout and carton construction adapted for packaging of liquids or powders, including a closed paperboard carton having an exterior and an interior surface, one portion of said carton having an opening therethrough to thereby define a dispensing opening, an annular pour spout having an integral flange, said flange rigidly mounted exteriorly on said carton, said pour spout having a spout passageway at least partially aligned with said dispensing opening, the carton exterior, at least in the area of said pour spout flange, having a layer of plastic, an annular weld zone on said flange for bonding said spout to said carton through said carton exterior plastic layer, said zone having a knurled surface on the top surface of the flange, said weld zone located at the radially outermost portion of said spout flange, the knurled portion of the spout flange being of lesser thickness than the remainder of the spout flange.

2. The construction of claim 1 wherein said knurled surface is defined by male knurls.

3. The construction of claims 1 wherein the thickness of said flange, except at said annular weld zone, is about 0.02 inches.

4. The construction of claim 1 wherein said exterior carton layer extends radially inwardly from the edge of said dispensing opening and terminates at an opening termed a pour opening, and wherein a barrier layer is provided on the carton interior radially outwardly of said dispensing opening and extends radially inwardly of said dispensing opening and terminates at said pour opening; said exterior carton barrier layer and said internal barrier layer forming a laminate which is ultrasonically welded together along a continuous annular zone, whereby the raw edge of said dispensing opening is covered by said barrier layers and cannot contaminate the contents of the carton.

5. The combination of claim 4 wherein the diameter of said pour opening is substantially the same as the internal diameter of said spout, and wherein the diameter of said dispensing opening is smaller then that of said ultrasonic welds which join the pour spout flange to the carton exterior.

6. A method of attaching a flanged plastic pour spout over a dispensing opening in a paperboard panel, the latter having an external and an internal surface, the paperboard panel having a plastic layer over its external surface, the steps of, providing an ultrasonic sealing horn having an otherwise flat annular surface with knurling on an annularly continuous zone on its working face, placing said ultrasonic sealing horn on the outer surface of said spout flange and placing the inner surface of said flange on said panel plastic layer, placing a backup mandrel beneath and in contact with the internal surface of said paperboard panel, applying a force on said ultrasonic horn to squeeze said ultrasonic horn knurlings against the radially outermost portion of the spout flange outer surface, applying energy to said ultrasonic horn to thereby sonicly bond said spout flange to said paperboard panel external surface at locations corresponding to the knurlings.

7. The method of claim 6 wherein said knurlings on the working face of the horn are female.

8. The method of claim 6 wherein the knurled zone on the horn face is of a radial dimension less than the entire radial width of the horn face and wherein the unknurled portion of the horn face is tapered.

9. The method of claim 6 wherein the radially outermost portion of the working face of the horn is provided with a continuous annular recess, whereby plastic material from the flange is inhibited during the bonding process from creeping radially outwardly and up the sides of the horn.

* * * * *